US010906294B2

(12) United States Patent
Tsuji et al.

(10) Patent No.: US 10,906,294 B2
(45) Date of Patent: Feb. 2, 2021

(54) METHOD FOR PRODUCING PRINTED MATTER

(71) Applicant: TORAY INDUSTRIES, INC., Tokyo (JP)

(72) Inventors: Yuichi Tsuji, Otsu (JP); Takejiro Inoue, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 88 days.

(21) Appl. No.: 16/094,639

(22) PCT Filed: May 19, 2017

(86) PCT No.: PCT/JP2017/018830
§ 371 (c)(1),
(2) Date: Oct. 18, 2018

(87) PCT Pub. No.: WO2017/204104
PCT Pub. Date: Nov. 30, 2017

(65) Prior Publication Data
US 2019/0105894 A1 Apr. 11, 2019

(30) Foreign Application Priority Data
May 27, 2016 (JP) ................. 2016-105993

(51) Int. Cl.
| B41F 35/00 | (2006.01) |
| B41M 1/06 | (2006.01) |
| B41N 3/08 | (2006.01) |
| C09D 11/101 | (2014.01) |
| B41F 35/02 | (2006.01) |
| B41F 35/06 | (2006.01) |
| H01M 4/36 | (2006.01) |

(52) U.S. Cl.
CPC .......... *B41F 35/002* (2013.01); *B41F 35/001* (2013.01); *B41F 35/02* (2013.01); *B41F 35/06* (2013.01); *B41M 1/06* (2013.01); *B41N 3/08* (2013.01); *C09D 11/101* (2013.01); *H01M 4/366* (2013.01)

(58) Field of Classification Search
None
See application file for complete search history.

(56) References Cited

U.S. PATENT DOCUMENTS

| 5,228,906 A | 7/1993 | Fidler |
| 6,039,965 A * | 3/2000 | Donlan .................... C02F 1/50 424/405 |
| 2005/0051043 A1 | 3/2005 | Hojjati |
| 2012/0320123 A1 | 12/2012 | Takeda et al. |

FOREIGN PATENT DOCUMENTS

| CN | 101272914 A | 9/2008 | |
| CN | 102827506 A | 12/2012 | |
| EP | 0677090 B1 * | 1/2003 | ............... C11D 1/04 |
| JP | 8-108662 A | 4/1996 | |
| JP | 2008-119921 A | 5/2008 | |
| JP | 2008-132791 A | 6/2008 | |
| JP | 2008-143993 A | 6/2008 | |
| JP | 2011-225754 A | 11/2011 | |
| WO | WO 2007/039474 A1 | 4/2007 | |

OTHER PUBLICATIONS

International Search Report, issued in PCT/JP2017/018830, PCT/ISA/210, dated Aug. 1, 2017.
Written Opinion of the International Searching Authority, issued in PCT/JP2017/018830, PCT/ISA/237, dated Aug. 1, 2017.
Chinese Office Action, dated Dec. 18, 2019, for Chinese Application No. 201780031204.3, along with an English translation.
Zhiwei, "Digital Printing Practical Manual," Printing Industry Press, May 2013, Total pp. 5.
Extended European Search Report for European Application No. 17802696.9, dated Dec. 17, 2019.
Japanese Notice of Reasons for Refusal and English translation for Japanese Application No. 2017-534748, dated Aug. 4, 2020.

* cited by examiner

*Primary Examiner* — Joshua D Zimmerman
(74) *Attorney, Agent, or Firm* — Birch, Stewart, Kolasch & Birch, LLP

(57) ABSTRACT

The present invention aims to provide a method of producing a printed matter that shows suppressed scumming in planography. A method of producing a printed matter, the method including the steps of: allowing a dampening water to adhere to a hydrophilic layer of a planographic printing plate having at least the hydrophilic layer and a heat sensitive layer; allowing an ink to adhere to the heat sensitive layer; and transferring the ink adhering to the heat sensitive layer to an object to be printed; wherein the pH (A) of the ink and the pH (B) of the dampening water are both from 1 to 6.5.

20 Claims, No Drawings

METHOD FOR PRODUCING PRINTED MATTER

TECHNICAL FIELD

The present invention relates to a method for producing a printed matter.

BACKGROUND ART

Planography is a printing method that has been widely used as a system for supplying printed matters quickly, in a large amount, and inexpensively. Further, in recent years, from the viewpoint of solving environmental issues, there is a demand for reduction of volatile compounds contained in inks for planography. Therefore, utilization of planographic inks which do not contain a volatile compound and which can be instantly cured by irradiation with an active energy ray (hereinafter referred to as active energy ray-curable planographic inks) has been promoted. Active energy ray-curable planography, which uses the above active energy ray-curable planographic inks, not only has advantages from the environmental point of view, but also shortens the drying step, thereby further increasing productivity in planography.

In planography, a substance that repels an ink is used as the non-image area to allow patterning for image formation. Examples of planography include water-based planography, which uses a dampening water as a substance that repels an ink, and waterless planography, which uses a silicone rubber.

In water-based planography, in which a dampening water is constantly supplied to a printing plate, the dampening water in the non-image area is in contact with the ink on the printing plate, and printing is allowed in a state where the dampening water is emulsified in the ink. In cases where this emulsification is insufficient, the ink does not adhere to the image area, resulting in printing failures such as low density on the printed matter or poor halftone dot reproducibility. In cases where excessive emulsification occurs, and hence partial dissolution occurs, the ink becomes less cohesive, and its viscosity sharply decreases, leading to lower repellency to the dampening water. As a result, the ink adheres to the non-image area, where adherence of the ink originally does not occur, resulting in a printing failure called scumming, in which printing occurs on blank areas of the printed matter.

In particular, in inks for active energy ray-curable planography, the suitable range of the amount of supply of the dampening water for the emulsification tends to be narrow compared to oil-based planographic inks, and therefore excessive emulsification is likely to occur. This is because the resins used in active energy ray-curable planographic inks have lower molecular weights, and their (meth)acrylate compounds have higher polarities (hydrophilicities) compared to oil-based planographic inks, so that the inks have insufficient cohesiveness.

Thus, for a conventional active energy ray-curable ink, an attempt has been made, aiming at expanding the suitable range of amount of supply of the dampening water for the emulsification, by adding an oligoethylene glycol monoether to the ink to increase the ability of the ink to incorporate the dampening water therein, thereby reducing the change in the viscoelasticity due to the emulsification and improving the emulsification rate (Patent Document 1).

PRIOR ART DOCUMENT

Patent Document

[Patent Document 1] JP 2011-225754 A (Claims)

SUMMARY OF THE INVENTION

Problems to be Solved by the Invention

However, since resins and (meth)acrylate compounds remain to be major components of inks, the cohesiveness of inks essentially remains insufficient.

In view of this, the present invention provides a method for producing a printed matter, which method overcomes the above problem of conventional techniques to impart sufficient cohesiveness to an ink, thereby suppressing the excessiveness of emulsification during printing. By using the method for producing a printed matter, a printed matter having excellent printing quality can be obtained.

Means for Solving the Problems

A method for producing a printed matter, the method comprising the steps of: allowing a dampening water to adhere to a hydrophilic layer of a planographic printing plate having at least the hydrophilic layer and a heat sensitive layer; allowing an ink to adhere to the heat sensitive layer; and transferring the ink adhering to the heat sensitive layer to an object to be printed; wherein the pH (A) of the ink and the pH (B) of the dampening water are both from 1 to 6.5.

Effect of the Invention

According to the present invention, since, in the method for producing a printed matter, the method comprising the steps of: allowing a dampening water to adhere to a hydrophilic layer of a planographic printing plate having at least the hydrophilic layer and a heat sensitive layer; allowing an ink to adhere to the heat sensitive layer; and transferring the adhering ink to an object to be printed; the pH (A) of the ink and the pH (B) of the dampening water are both not more than 6.5, excessiveness of emulsification of the ink can be suppressed, so that an excellent scumming resistance can be achieved. By using the method for producing a printed matter, a printed matter having excellent printing quality can be obtained. The ink after the printing can be washed off using a basic aqueous washing liquid.

MODE FOR CARRYING OUT THE INVENTION

The present invention is described below more concretely.
The method for producing a printed matter of the present invention comprises the steps of: allowing a dampening water to adhere to a hydrophilic layer of a planographic printing plate having at least the hydrophilic layer and a heat sensitive layer; allowing an ink to adhere to the heat sensitive layer; and transferring the adhering ink to an object to be printed. The steps are usually sequentially carried out.

In water-based planography, a dampening water is supplied to the whole area on a planographic printing plate having on its surface a hydrophilic layer and a heat sensitive layer, and the dampening water is retained on the hydrophilic layer surface. Subsequently, an ink is supplied to the whole area on the printing plate to allow its selective adhesion to the heat sensitive layer surface corresponding to the image area. The adhering ink is transferred to a base material to achieve printing of an image.

A planographic printing plate having on its surface a hydrophilic layer and a heat sensitive layer can be prepared from a planographic printing plate precursor in which the hydrophilic layer and the heat sensitive layer are sequentially layered on a printing plate base material. As the hydrophilic layer, aluminum or the like is used for retaining and maintaining the dampening water, which is continuously supplied, on the printing plate. The aluminum is preferably aluminum subjected to surface treatment such as surface roughening or anodic oxidation. Such treatment improves hydrophilicity and water retention.

The heat sensitive layer preferably contains a dye. The heat sensitive layer preferably contains a polymerizable compound in addition to the dye. The heat sensitive layer may further contain a polymerization initiator. The dye is preferably a dye that absorbs infrared light and converts it to heat since direct drawing of a print image by infrared laser light is possible therewith. Examples of the infrared absorbing dye include dyes such as azo dyes, metal complex salt azo dyes, pyrazolone azo dyes, naphthoquinone dyes, quinonimine dyes, methine dyes, cyanine dyes, carbonium dyes, squarylium doze, and metal thiolate complexes.

The polymerizable compound is a compound having one or more ethylenically unsaturated bonds, such as various (meth)acrylates and styrenes.

The polymerization initiator is a compound which generates radicals using energy of light or heat, or both of these, to initiate and promote polymerization of a polymerizable compound. As the polymerization initiator, a known thermal polymerization initiator, a compound having a bond whose bond dissociation energy is low, a photopolymerization initiator, or the like may be used. Specific examples of the polymerization initiator include organic halides, carbonyl compounds, azo-based polymerization initiators, organic peroxides, metallocene compounds, azide compounds, hexaarylbiimidazole compounds, organic borate compounds, disulfone compounds, oxime ester compounds, and onium salt compounds.

The method for preparing the planographic printing plate is not limited, and a method including a step of using laser for exposure of the planographic printing plate precursor is preferably used. Although preparation of the planographic printing plate is possible even with the above step alone, the preparation method preferably includes a step of subjecting the exposed planographic printing plate precursor to chemical liquid treatment or physical stimulation to remove the unexposed portion, thereby allowing development. The exposure step preferably uses a laser light source having an emission wavelength region within the range of from 300 nm to 1500 nm. Examples of the laser light source include lasers such as argon ion, krypton ion, helium-neon, helium-cadmium, ruby, glass, YAG, titanium-sapphire, dye, nitrogen, metal vapor, excimer, free electron, and semiconductor lasers. Among these, semiconductor lasers having an emission wavelength region close to the near-infrared region are preferably used.

The method for producing a printed matter of the present invention is characterized in that the pH (A) of the ink and the pH (B) of the dampening water are both not more than 6.5. In the present description, the pH (A) of the ink means the pH value of 1% by mass aqueous solution of the ink measured at 25° C., and the pH (B) of the dampening water means the pH value of the dampening water measured at 25° C. The aqueous solution may also be in the form of a dispersion of a pigment in water. Since the resins and the polyfunctional (meth)acrylates used in common active energy ray-curable planographic inks are neutral and hydrophilic, the dampening water continues to be incorporated into the ink, leading to excessive emulsification of the ink. Since, in the method for producing a printed matter of the present invention, the pH (A) of the ink and the pH (B) of the dampening water are both not more than 6.5, the ink has a low affinity to the dampening water, and the excessive emulsification can therefore be suppressed. As for the pH measurement method, the pH can be determined by the test method described in JIS Z 8802:1984.

In the method for producing a printed matter of the present invention, the pH (A) of the ink and the pH (B) of the dampening water preferably satisfy (A)>(B). Since the pH (B) of the dampening water used in the method for producing a printed matter of the present invention is lower than the pH (A) of the ink, the ink has a low affinity to the dampening water. Therefore, the dampening water is less likely to be incorporated, and the excessive emulsification can be suppressed.

The dampening water preferably has a pH of from 3 to 6. The dampening water preferably has a pH of not less than 3, more preferably has a pH of not less than 4 so that the ink used in the method for producing a printed matter of the present invention can allow emulsification of the dampening water and so that the printing apparatus is not damaged due to rusting or the like. The dampening water preferably has a pH of not more than 6, more preferably has a pH of not more than 5 so that sensitization of the heat sensitive layer of the printing plate, dissolution of the ink, and excessive emulsification can be suppressed. The sensitization herein means that the hydrophilicity of the heat sensitive layer in the non-image area of the printing plate decreases due to adherence of the ink.

The dampening water preferably has a water content of from 90% by mass to 99% by mass. The dampening water may contain an acid for adjusting the pH to an acidic pH with a pH adjusting agent. Specific examples of the acid include acetic acid, citric acid, oxalic acid, malic acid, tartaric acid, lactic acid, ascorbic acid, gluconic acid, hydroxyacetic acid, malonic acid, sulfanilic acid, p-toluenesulfonic acid, organic phosphonic acid, phosphoric acid, nitric acid, sulfuric acid, and polyphosphoric acid. Further specific examples include alkali metal salts, alkaline earth metal salts, ammonium salts, and organic amine salts of these acids.

The dampening water may also contain an alcohol or a glycol from the viewpoint of reducing the dynamic surface tension to allow easy wetting of the printing plate surface. Specific examples of the alcohol or the glycol include 3-methyl-1-butyn-3-ol, 2-butyn-1,4-diol, 3-methyl-1-pentyn-3-ol, 2,5-dimethyl-3-hexyne-2,5-diol, 3,5-dimethyl-1-hexyn-3-ol, 3,6-dimethyl-4-octyne-3,6-diol, 2,4,7,9-tetramethyl-5-decyne-4,7-diol, 2,5,8,11-tetramethyl-6-dodecyne-5,8-diol, and ethylene oxide adducts and propylene oxide adducts thereof.

The ink used in the present invention preferably has a pH of from 3 to 6. The ink used in the method for producing a printed matter of the present invention preferably has a pH of not less than 3, more preferably has a pH of not less than 4 so that the ink does not cause damage, such as rusting, to the printing apparatus. The ink preferably has a pH of not more than 6, more preferably has a pH of not more than 5 so that the dampening water does not have compatibility with the ink, and so that excessive emulsification can be suppressed.

The difference between the pH (A) of the ink and the pH (B) of the dampening water (pH (A)−pH (B)) is preferably from 1 to 2. In cases where the pH difference is less than 1, the ink easily incorporates the dampening water therein, so that excessive emulsification is likely to occur. In cases where the pH difference is more than 2, the ink does not easily incorporate the dampening water therein, so that the emulsification is likely to be insufficient.

In the method for producing a printed matter of the present invention, the step of transferring the adhering ink to the object to be printed is preferably a step of transferring the adhering ink directly or through a blanket. The step of direct transfer allows the ink to show a good transfer performance. The step of transfer through a blanket, because of mediation by a flexible blanket, causes less damage to the printing plate, resulting in an increased printing durability.

In the method for producing a printed matter of the present invention, the ink is preferably irradiated with an active energy ray after its application to the base material by planography. By the irradiation with the active energy ray, the ink coating on the base material can be instantly cured. Any active energy ray may be used as long as it has an excitation energy required for the curing reaction, and preferred examples of the active energy ray include ultraviolet rays and electron beams. In cases where an electron beam is used for the curing, an electron beam apparatus having an active energy ray of from 100 to 500 eV is preferably used. In cases where an ultraviolet ray is used for the curing, an ultraviolet irradiation apparatus such as a high-pressure mercury lamp, a xenon lamp, a metal halide lamp, or a light emitting diode (LED) is preferably used. A light emitting diode is especially preferably used from the viewpoint of reducing heat generation and energy saving. The ray emitted from the light emitting diode preferably has a wavelength of from 350 to 420 nm. In the method for producing a printed matter of the present invention, the base material to which the ink is applied is preferably subjected to irradiation with an active energy ray to allow curing of the ink using a conveyor at a conveying speed of from 50 to 150 m/min. from the viewpoint of productivity.

The method for producing a printed matter of the present invention preferably includes a step of removing excessive ink on the printing machine using a wash water after the application of the ink to the base material by planography. By the removal using the wash water, volatile organic compounds (VOC) in the operation can be reduced, which is preferred from the viewpoint of management of health and safety of the operator, and suppression of discharge of organic waste liquids.

The wash water preferably has a pH of from 8 to 13. In the method for producing a printed matter of the present invention, since the ink is acidic, the ink has a low affinity to the dampening water, while it has a high solubility in a basic aqueous solution. Thus, in cases where the wash water has a pH of not less than 8, the ink can be dissolved and washed off. The pH of the wash water is more preferably not less than 9. In cases where the pH of the wash water is not more than 13, damage to printing apparatuses such as the printing machine and the printing plate can be reduced, which is preferred. The wash water more preferably has a pH of not more than 11.

The wash water preferably contains water at from 90% by mass to 99% by mass with respect to the total mass. By the inclusion of water at not less than 90% by mass, influence on health and safety of the operator can be reduced. By the inclusion of water at not more than 99% by mass, the ink solubility can be improved, and operability including the inter-roller transfer performance and the doctor-blade scraping performance can be improved.

For adjusting the pH to a basic pH, the wash water may contain a compound that shows basicity in an aqueous solution, such as an amino group-containing compound or an inorganic salt.

Examples of the amino group-containing compound include alkylamines, hydroxyl group-containing alkylamines, and polyalkylene oxide-modified amines. Those with monofunctional amino groups are especially preferred. In particular, ethanolamines and polyalkylene oxide-modified amines are preferred from the viewpoint of preventing toxicity to the body, and polyalkylene oxide-modified amines are especially preferred from the viewpoint of reducing VOCs since they are non-volatile.

By inclusion of the compound at from 0.1% by mass to 10% by mass in the wash water, the pH can be maintained within an appropriate range, and safety and operability can be maintained.

The wash water may also contain a compound such as an alcohol, a glycol, or a surfactant from the viewpoint of reducing the dynamic surface tension and improving operability including the inter-roller transfer performance and the doctor-blade scraping performance. Among these compounds, non-volatile compounds are preferred due to reducing VOCs.

By inclusion of the compound at from 0.1% by mass to 10% by mass in the wash water, operability can be improved.

Examples of the object to be printed (hereinafter referred to as "base material") include, but are not limited to, art paper, coated paper, cast paper, synthetic paper, newsprint paper, aluminum-deposited paper, metal, polypropylene, and polyethylene terephthalate.

The ink coating on the base material preferably has a thickness of from 0.1 to 50 µm. In cases where the ink coating has a thickness within this range, the ink cost can be reduced while maintaining a good printing quality.

The ink used in the method for producing a printed matter of the present invention contains a pigment. As the pigment, one or both of an inorganic pigment(s) and an organic pigment(s) commonly used as inks may be used.

Examples of the inorganic pigment include titanium dioxide, calcium carbonate, barium sulfate, red iron oxide, cadmium red, chrome yellow, zinc yellow, iron blue, ultramarine blue, organic bentonite, alumina white, ferric oxide, carbon black, graphite, aluminum, and brass pieces. These may be subjected to surface treatment for imparting easily dispersible properties, and/or may be subjected to surface treatment for giving a metallic color or a pearl-like color.

Examples of the organic pigment include phthalocyanine pigments, soluble azo pigments, insoluble azo pigments, lake pigments, quinacridone pigments, isoindoline pigments, threne pigments, and metal complex pigments. Specific examples of the organic pigment include phthalocyanine blue, phthalocyanine green, azo red, monoazo red, monoazo yellow, disazo red, disazo yellow, quinacridone red, quinacridone magenta, and isoindoline yellow.

The concentration of the pigment contained in the ink to be used for the method for producing a printed matter of the present invention is preferably not less than 5% by mass, more preferably not less than 10% by mass, still more preferably not less than 15% by mass from the viewpoint of achieving a density of a printed paper surface. The pigment concentration is preferably not more than 50% by mass, more preferably not more than 40% by mass, still more preferably not more than 30% by mass from the viewpoint of increasing the fluidity of the ink and obtaining a good inter-roller transfer performance.

The ink used in the method for producing a printed matter of the present invention contains a resin having an acidic group. The acidic group has interaction such as hydrogen bonding to increase the cohesiveness of the ink under high-shear conditions during printing. As the cohesiveness of the ink increases, the change in the viscoelasticity upon the emulsification of the dampening water decreases, and repellency to the dampening water corresponding to the non-image area increases, resulting in improved scumming resistance. Further, since the acidic group allows dispersion stabilization of the pigment in the ink, the ink can have improved fluidity.

Since the resin causes dissociation of the acidic group in the solution, the solution shows acidity, and therefore excessive emulsification of the acidic dampening water can be suppressed.

Preferred examples of the acidic group in the resin having the acidic group include a carboxyl group, a sulfo group, and a phosphate group. Among these, a carboxyl group is especially preferred since it allows good dispersion of the pigment.

The resin having an acidic group preferably has an acid value of not less than 70 mg KOH/g from the viewpoint of improving the cohesiveness of the ink and improving the pigment dispersibility. The acid value is more preferably not less than 80 mg KOH/g, still more preferably not less than 90 mg KOH/g. In cases where the acid value is not more than 250 mg KOH/g, the fluidity of the ink can be maintained, leading to a good transfer performance, which is preferred. The acid value is more preferably not more than 200 mg KOH/g, still more preferably not more than 150 mg KOH/g. The acid value of the resin can be determined according to the neutralization titration method in Section 3.1 of the test method of JIS K 0070: 1992.

In cases where the resin having an acidic group has a weight average molecular weight of not less than 5000, the cohesiveness of the ink increases, which is preferred. The weight average molecular weight is more preferably not less than 15,000, still more preferably not less than 20,000. In cases where the weight average molecular weight is not more than 100,000, the fluidity of the ink can be maintained, which is preferred. The weight average molecular weight is more preferably not more than 75,000, still more preferably not more than 50,000. The weight average molecular weight of the resin, in terms of polystyrene, can be obtained by measurement using gel permeation chromatography (GPC).

Examples of the resin having an acidic group include, but are not limited to, acrylic resins, styrene acrylic resins, styrene maleic acid resins, rosin-modified maleic acid resins, rosin-modified acrylic resins, epoxy resins, polyester resins, polyurethane resins, and phenol resins. Among the resins described above, acrylic resins, styrene acrylic resins, and styrene maleic acid resins are preferably used as the resin having an acidic group from the viewpoint of availability of their monomers, reduction of the cost, simplicity of the synthesis, compatibility with other components of the ink, dispersibility of the pigment, and the like.

Among the resins described above, acrylic resins, styrene acrylic resins, and styrene maleic acid resins can be prepared by the following method. These can be obtained by polymerization or copolymerization, using a radical polymerization initiator, of a compound(s) selected from, for example, carboxyl group-containing monomers such as acrylic acid, methacrylic acid, itaconic acid, crotonic acid, maleic acid, fumaric acid, vinyl acetate, and acid anhydrides thereof; hydroxyl group-containing monomers such as 2-hydroxyethyl acrylate; amino group-containing monomers such as dimethylaminoethyl methacrylate; mercapto group-containing monomers such as acrylic acid 2-(mercaptoacetoxy) ethyl; sulfo group-containing monomers such as acrylamide t-butyl sulfonic acid; phosphate group-containing monomers such as 2-methacryloxyethyl acid phosphate; methacrylic acid esters; acrylic acid esters; styrene; acrylonitrile; and vinyl acetate.

Specific examples of the resin having an acidic group include (meth)acrylic acid copolymers, (meth)acrylic acid-(meth)acrylic acid ester copolymers, styrene-(meth)acrylic acid copolymers, styrene-(meth)acrylic acid-(meth)acrylic acid ester copolymers, styrene-maleic acid copolymers, styrene-maleic acid-(meth)acrylic acid copolymers, and styrene-maleic acid-(meth)acrylic acid ester copolymers.

The resin having an acidic group preferably further has an ethylenically unsaturated group from the viewpoint of improving the curing sensitivity to the active energy ray. The ethylenically unsaturated group in the resin having an acidic group preferably has an iodine value of from 0.5 mol/kg to 3.0 mol/kg. In cases where the iodine value is within this range, the sensitivity to the active energy ray can be increased, and good shelf stability can be obtained, which is preferred. The iodine value of the ethylenically unsaturated group can be determined by the method described in Section 6.0 of the test method of JIS K 0070: 1992.

The resin having an acidic group and an ethylenically unsaturated group can be prepared by the following method. By addition reaction of an ethylenically unsaturated compound having a glycidyl group or an isocyanate group; acrylic acid chloride; methacrylic acid chloride; or allyl chloride; with a carboxyl group that is an active hydrogen-containing group in a resin having an acidic group, a resin having the acidic group and an ethylenically unsaturated group can be obtained. However, the method is not limited thereto.

Specific examples of the ethylenically unsaturated compound having a glycidyl group include glycidyl acrylate, glycidyl methacrylate, allyl glycidyl ether, crotonic acid glycidyl, and isocrotonic acid glycidyl.

Specific examples of the ethylenically unsaturated compound having an isocyanate group include acryloyl isocyanate, methacryloyl isocyanate, acryloyl ethyl isocyanate, and methacryloyl ethyl isocyanate.

The ink used in the method for producing a printed matter of the present invention preferably contains the resin having an acidic group at from 5% by mass to 50% by mass. In cases where the resin content is within this range, the cohesiveness of the ink and the dispersibility of the pigment can be well maintained.

The ink used in the method for producing a printed matter of the present invention preferably contains a polyfunctional (meth)acrylate having a hydroxyl group. By the inclusion of the polyfunctional (meth)acrylate having a hydroxyl group, the active energy ray-curable ink of the present invention can have active energy ray-curability.

The hydroxyl group has interaction, such as hydrogen bonding, with the resin having an acidic group. By this, the cohesiveness of the ink under high-shear conditions during printing can be increased, resulting in improved scumming resistance of the ink. Further, since the hydroxyl group allows stabilization of the pigment dispersion, the ink can have improved fluidity.

In cases where the polyfunctional (meth)acrylate having a hydroxyl group has a hydroxyl value of not less than 50 mg KOH/g, the cohesiveness of the ink can be improved, and the pigment dispersibility can be improved, which is preferred. The hydroxyl value is more preferably not less than 75 mg KOH/g, still more preferably not less than 100 mg KOH/g. In cases where the hydroxyl value is not more than 200 mg KOH/g, the fluidity of the ink can be well maintained, which is preferred. The hydroxyl value is more preferably not more than 180 mg KOH/g, still more preferably not more than 160 mg KOH/g.

In cases where the polyfunctional (meth)acrylate having a hydroxyl group has a molecular weight of not less than 100, the cohesiveness of the ink can be improved, which is preferred. The molecular weight is more preferably not less than 200, still more preferably not less than 250. In cases where the molecular weight is not more than 1000, the fluidity of the ink can be well maintained, which is preferred. The molecular weight is more preferably not more than 700, still more preferably not more than 500.

Specific examples of the polyfunctional (meth)acrylate having a hydroxyl group include poly(meth)acrylates of polyhydric alcohols such as trimethylolpropane, glycerin, pentaerythritol, diglycerin, ditrimethylolpropane, isocyanuric acid, and dipentaerythritol; and their alkylene oxide adducts. More specific examples of the polyfunctional (meth)acrylate having a hydroxyl group include di(meth)acrylate of trimethylolpropane, di(meth)acrylate of glycerin, di- or tri-(meth)acrylate of pentaerythritol, di- or tri-(meth)acrylate of diglycerin, di or tri(meth)acrylate of ditrimethylolpropane, and di-, tri-, tetra-, or penta-(meth)acrylate of dipentaerythritol; and their ethylene oxide adducts, propylene oxide adducts, and tetraethylene oxide adducts. Among these, from the viewpoint of improving the cohesiveness of the ink used in the method for producing a printed matter of the present invention, and of improving the pigment dispersibility, pentaerythritol tri(meth)acrylate, diglycerin tri(meth)acrylate, and ditrimethylolpropane tri(meth)acrylate are especially preferred.

In cases where the content of the polyfunctional (meth)acrylate having a hydroxyl group in the ink used in the method for producing a printed matter of the present invention is not less than 20% by mass, the cohesiveness of the ink can be improved, and the pigment dispersibility can be improved, which is preferred. The content is more preferably not less than 30% by mass, still more preferably not less than 40% by mass. The content is preferably not more than 70% by mass from the viewpoint of well maintaining the fluidity of the ink. The content is more preferably not more than 60% by mass, still more preferably not more than 50% by mass.

Preferably, the ink used in the method for producing a printed matter of the present invention contains a photopolymerization initiator, and has ultraviolet curability. Further, the ink preferably contains a sensitizer in addition to the photopolymerization initiator.

The photopolymerization initiator used in the present invention is preferably one that generates active radical species. Specific examples of such a polymerization initiator include benzophenone, methyl o-benzoyl benzoate, 4,4-bis(dimethylamino)benzophenone (another name: Michler's ketone), 4,4-bis(diethylamino)benzophenone, 4,4'-dichlorobenzophenone, 4-benzoyl-4-methyldiphenylketone, 1-hydroxycyclohexyl-phenylketone, 4-phenylbenzophenone, hydroxybenzophenone, dibenzylketone, fluorenone, 2,2-diethoxyacetophenone, 2,2-dimethoxy-2-phenyl-2-phenylacetophenone, 2-hydroxy-2-methyl-1-phenylpropan-1-one, 1-[4-(2-hydroxyethoxy)-phenyl]-2-hydroxy-2-methyl-1-propan-1-one, p-t-butyldichloroacetophenone, thioxanthone, 2-methylthioxanthone, 2-chlorothioxanthone, 2-isopropylthioxanthone, 2,4-diethylthioxanthone, 2,4-dichlorothioxanthone, benzyldimethyl ketanol, benzylmethoxyethylacetal, benzoin, benzoin methyl ether, benzoin ethyl ether, benzoin isopropyl ether, benzoin butyl ether, anthraquinone, 2-t-butylanthraquinone, 2-amylanthraquinone, β-chloroanthraquinone, anthrone, benzanthrone, dibenzosuberone, methylene anthrone, 4-azidobenzalacetophenone, 2,6-bis(p-azidobenzylidene)cyclohexanone, 2,6-bis(p-azidobenzylidene)-4-methylcyclohexanone, 2-phenyl-1,2-butadione-2-(o-methoxycarbonyl)oxime, 1-phenyl-1,2-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, 2-methyl-[4-(methylthio)phenyl]-2-morpholino-1-propan-1-one, 2-benzyl-2-dimethylamino-1-(4-morpholinophenyl)-butanone, naphthalenesulfonyl chloride, quinolinesulfonyl chloride, N-phenylthioacridone, 4,4-azobisisobutyronitrile, diphenyl disulfide, benzthiazole disulfide, triphenylphosphine, 2,4,6-trimethylbenzoyl-diphenyl-phosphine oxide, and bis(2,4,6-trimethylbenzoyl)-phenyl-phosphine oxide. Specific examples of the sensitizer include 2-methylthioxanthone, 2-chlorothioxanthone, 2-isopropylthioxanthone, 2,4-diethylthioxanthone, 2,4-dichlorothioxanthone, 2,3-bis(4-diethylaminobenzal)cyclopentanone, 2,6-bis(4-dimethylaminobenzal)cyclohexanone, 2,6-bis(4-dimethylaminobenzal)-4-methylcyclohexanone, 4,4-bis(dimethylamino)-benzophenone (another name: Michler's ketone), 4,4-bis(diethylamino)-benzophenone, 4,4-bis(dimethylamino)chalcone, 4,4-bis(diethylamino)chalcone, p-dimethylaminocinnamylideneindanone, p-dimethylaminobenzylideneindanone, 2-(p-dimethylaminophenylvinylene)-isonaphthothiazole, 1,3-bis(4-dimethylaminobenzal) acetone, 1,3-carbonyl-bis(4-diethylaminobenzal)acetone, 3,3-carbonyl-bis(7-diethylaminocoumarin), N-phenyl-N-ethylethanolamine, N-phenylethanolamine, N-tolyldiethanolamine, methyl dimethylaminobenzoate, ethyl dimethylaminobenzoate, isoamyl dimethylaminobenzoate, methyl diethylaminobenzoate, ethyl diethylaminobenzoate, isoamyl diethylaminobenzoate, 3-phenyl-5-benzoylthiotetrazole, and 1-phenyl-5-ethoxycarbonylthiotetrazole.

The ink used in the present invention may contain one or more of these photopolymerization initiators and sensitizers.

The ink used in the present invention preferably contains the photopolymerization initiator at not less than 0.1% by mass from the viewpoint of obtaining good curability. The content of the photopolymerization initiator is more preferably not less than 1% by mass, still more preferably not less than 3% by mass. In cases where the ink contains the photopolymerization initiator at not more than 20% by mass, the shelf stability of the ink can be improved, which is preferred. The content of the photopolymerization initiator is more preferably not more than 15% by mass, still more preferably not more than 10% by mass.

In cases where a sensitizer is added, the content of the sensitizer in the ink is preferably not less than 0.1% by mass, more preferably not less than 1% by mass, still more preferably not less than 3% by mass from the viewpoint of giving good sensitivity to the ink. The content in the ink is preferably not more than 20% by mass, more preferably not more than 15% by mass, still more preferably not more than 10% by mass from the viewpoint of improvement of the shelf stability of the ink.

The ink used in the present invention preferably contains a surfactant. By the inclusion of the surfactant, the surfactant can be allowed to incorporate the dampening water in the ink to form a W/O type emulsion, thereby improving the dampening water-incorporation ability of the ink without decreasing the ink cohesiveness. By this, the acceptable range of the amount of supply of the dampening water suitable for the emulsification can be expanded, and an improved printability can be achieved.

The ratio between hydrophilic groups and hydrophobic groups in the surfactant can be represented by the HLB value. The HLB value herein is a value representing the degree of affinity of the surfactant to water and oil, and falls within the range of from 0 to 20, wherein the closer the value to 0, the higher the lipophilicity, while the closer the value to 20, the higher the hydrophilicity. The HLB value of the surfactant is preferably not less than 8 from the viewpoint of dissolution of water. The HLB value is more preferably not less than 10. The HLB value is preferably not more than 18 from the viewpoint of dissolution in the ink. The HLB value is more preferably not more than 16.

Specific examples of the surfactant include polyoxyethylene alkyl ether, polyoxyethylene lauryl ether, polyoxyethylene oleyl ether, polyoxyethylene stearyl ether, polyoxyethylene cetyl ether, polyoxyethylene palmitin ether, polyoxypropylene alkyl ether, polyoxypropylene lauryl ether, polyoxypropylene oleyl ether, polyoxypropylene stearyl ether, polyoxypropylene cetyl ether, polyoxypropylene palmitin ether, polyoxyalkylene alkyl ether, polyoxyalkylene lauryl ether, polyoxyalkylene oleyl ether, polyoxyalkylene stearyl ether, polyoxyalkylene cetyl ether, and polyoxyalkylene palmitin ether; mono-, di-, or tri-alkyl ether of sorbitan acid, mono-, di-, or tri-lauryl ether of sorbitan acid, mono-, di-, or tri-oleyl ether of sorbitan acid, mono-, di-, or tri-stearyl ether of sorbitan acid, mono-, di-, or tri-cetyl ether of sorbitan acid, and mono-, di-, or tri-palmitin ether of sorbitan acid; mono-, di-, or tri-alkyl ether of polyoxyethylene sorbitan acid, mono-, di-, or tri-lauryl ether of polyoxyethylene sorbitan acid, mono-, di-, or tri-oleyl ether of polyoxyethylene sorbitan acid, mono-, di-, or tri-stearyl ether of polyoxyethylene sorbitan acid, mono-, di-, or tri-cetyl ether of polyoxyethylene sorbitan acid, and mono-, di-, or tri-palmitin ether of polyoxyethylene sorbitan acid; and polyether-modified silicone oi.

The content of the surfactant in the ink used in the present invention is preferably not less than 1.0% by mass from the viewpoint of stabilization of the emulsified state by incorporation of the dampening water during printing. The content is more preferably not less than 1.5% by mass, still more preferably not less than 2.0% by mass. The content is preferably not more than 10% by mass from the viewpoint of preventing excessive incorporation of the dampening water into the ink during printing, and thereby preventing the ink from being compatible with the dampening water. The content is more preferably not more than 7% by mass, still more preferably not more than 5% by mass.

The ink used in the method for producing a printed matter of the present invention may contain a polyfunctional (meth)acrylate having no hydroxyl group. Examples of the polyfunctional (meth)acrylate having no hydroxyl group include the following:

bifunctional (meth)acrylates such as ethylene glycol di(meth)acrylate, diethylene glycol di(meth)acrylate, triethylene glycol di(meth)acrylate, polyethylene glycol di(meth)acrylate, tripropylene glycol di(meth)acrylate, 1,3-butylene glycol di(meth)acrylate, 1,6-hexane diol di(meth)acrylate, 1,9-nonanediol di(meth)acrylate, and neopentyl glycol di(meth)acrylate;

trifunctional (meth)acrylates such as trimethylolpropane tri(meth)acrylate, glycerin tri(meth)acrylate, and isocyanuric acid tri(meth)acrylate; and their ethylene oxide adducts and propylene oxide adducts;

tetrafunctional (meth)acrylates such as pentaerythritol tetra(meth)acrylate, ditrimethylolpropane tetra(meth)acrylate, and diglycerin tetra(meth)acrylate; and their ethylene oxide adducts and propylene oxide adducts; and penta- or higher-functional (meth)acrylates such as dipentaerythritol hexa(meth)acrylate, and their ethylene oxide adducts and propylene oxide adducts.

The ink used in the present invention preferably contains a polymerization inhibitor for improving the shelf stability. Specific examples of the polymerization inhibitor include hydroquinone, monoetherified products of hydroquinone, N-nitrosodiphenylamine, phenothiazine, p-t-butylcatechol, N-phenylnaphthylamine, 2,6-di-t-butyl-p-methylphenol, chloranil, and pyrogallol. The amount of the polymerization inhibitor added is preferably from 0.01% by mass to 5% by mass with respect to the ink from the viewpoint of obtaining good shelf stability.

The ink of the present invention preferably contains a pigment dispersing agent for increasing the dispersibility of the pigment. The optimal content of the pigment dispersing agent may vary depending on the density, particle size, surface area, and the like of the pigment used. The pigment dispersing agent acts on the surface of the pigment to suppress aggregation of the pigment. As a result, the pigment dispersibility increases, and the fluidity of the ink can be improved.

The content of the pigment dispersing agent is preferably from 5% by mass to 50% by mass with respect to the previous material from the viewpoint of improving the fluidity of the ink.

For the ink used in the method for producing a printed matter of the present invention, additives such as waxes, antifoaming agents, and transfer performance improvers may be used, if necessary.

The method for producing the ink to be used for the method for producing a printed matter of the present invention is described below. The ink is obtained by homogeneously mixing and dispersing a pigment(s), additive(s), and another/other component(s) together using a stirring/kneading machine such as a kneader, three-roll mill, ball mill, planetary ball mill, bead mill, roll mill, attritor, sand mill, gate mixer, paint shaker, homogenizer, or rotation-revolution stirrer. After the mixing and dispersion, or during the mixing and dispersion, defoaming is preferably carried out under vacuum or reduced pressure conditions.

EXAMPLES

The present invention is described below more concretely by way of Examples. However, the present invention is not limited to these.

<Preparation of Ink>

The inks to be used in the printing test were obtained by passing the compositions containing the resins, polyfunctional (meth)acrylates, pigments, photopolymerization initiators, and additives shown in Table 1-1 to Table 1-3 through a three-roll mill "EXAKT" (registered trademark) M-80S (manufactured by EXAKT) with a roller gap of 1 at a rate of 500 rpm five times. The raw materials of the inks are as follows.

<Raw Materials of Inks>

Resin 1: A copolymer composed of 25% by mass methyl methacrylate, 25% by mass styrene, and 50% by mass methacrylic acid was provided. By addition reaction of 0.55 equivalent of glycidyl methacrylate with respect to the carboxyl groups of the copolymer, Resin 1, which has an ethylenically unsaturated group and a hydrophilic group, was obtained. The Resin 1 obtained had a weight average molecular weight of 34,000, an acid value of 105 mg KOH/g, and an iodine value of 2.0 mol/kg.

Resin 2: Resin 2, which is composed of a copolymer of 30% by mass methyl methacrylate, 30% by mass styrene, and 40% by mass methacrylic acid, and has a hydrophilic group, was obtained. The Resin 2 obtained had a weight average molecular weight of 33,000 and an acid value of 268 mg KOH/g.

Resin 3: Resin 3, which is composed of a copolymer of 45% by mass methyl methacrylate, 20% by mass styrene, and 35% by mass methacrylic acid, and has a hydrophilic group, was obtained. The Resin 3 obtained had a weight average molecular weight of 21,000 and an acid value of 220 mg KOH/g.

Resin 4: Resin 4, which is composed of a copolymer of 67% by mass methyl methacrylate, 25% by mass styrene, and 8% by mass methacrylic acid, and has a hydrophilic group, was obtained. The Resin 4 obtained had a weight average molecular weight of 66,000 and an acid value of 45 mg KOH/g.

Resin 5: Isodap (manufactured by Daiso Chemical Co., Ltd.; diallyl phthalate resin; no hydrophilic group; weight average molecular weight, 30,000; acid value, 0 mg KOH/g).

Polyfunctional (Meth)acrylate 1: A mixture of pentaerythritol triacrylate and pentaerythritol tetraacrylate, "Miramer" (registered trademark) M340 (manufactured by Miwon Co., Ltd.). Having a hydroxyl group; hydroxyl value, 115 mg KOH/g.

Polyfunctional (Meth)acrylate 2: a mixture of pentaerythritol triacrylate and pentaerythritol tetraacrylate, "Aronix" (registered trademark) M-306 (manufactured by Toagosei Co., Ltd.). Having a hydroxyl group; hydroxyl value, 171 mg KOH/g.

Polyfunctional (Meth)acrylate 3: a mixture of ditrimethylolpropane triacrylate and ditrimethylolpropane tetraacrylate. Having a hydroxyl group; hydroxyl value, 72 mg KOH/g.

Polyfunctional (meth)acrylate 4: glycerin dimethacrylate "NK Ester" (registered trademark) 701 (manufactured by Shin-Nakamura Chemical Co., Ltd.). Having a hydroxyl group; hydroxyl value, 240 mg KOH/g.

Polyfunctional (Meth)acrylate 5: a mixture of dipentaerythritol pentaacrylate and dipentaerythritol hexaacrylate "Aronix" (registered trademark) M-402 (manufactured by Toagosei Co., Ltd.). Having a hydroxyl group; hydroxyl value, 28 mg KOH/g.

Polyfunctional (Meth)acrylate 6: ethylene oxide-modified pentaerythritol tetraacrylate "Miramer" (registered trademark) M4004 (manufactured by Miwon Co., Ltd.); no hydroxyl group.

Surfactant 1: "RHEODOL" (registered trademark) TW-L120 (manufactured by Kao Corporation). HLB value, 16.7.

Surfactant 2: "RHEODOL" (registered trademark) TW-S106V (manufactured by Kao Corporation). HLB value, 9.6.

Surfactant 3: "RHEODOL" (registered trademark) SP-P10 (manufactured by Kao Corporation). HLB value, 6.7.

Polymerization inhibitor: p-methoxyphenol (manufactured by Wako Pure Chemical Industries, Ltd.).

Pigment: Seika Cyanine Blue 4920 (manufactured by Dainichiseika Color & Chemicals Mfg. Co., Ltd.).

Photopolymerization initiator: "Irgacure" (registered trademark) 907 (manufactured by BASF).

Sensitizer: Diethylaminobenzophenone (manufactured by Tokyo Chemical Industry Co., Ltd.).

Wax: KTL-4N (manufactured by Kitamura Limited).

<Measurement of Weight Average Molecular Weight>

The weight average molecular weight of each resin was determined as a value measured by gel permeation chromatography (GPC) using tetrahydrofuran as a mobile phase. Shodex KF-803 was used as a column, and the weight average molecular weight was calculated in terms of polystyrene.

TABLE 1-1

| | | Ink type | | | | |
|---|---|---|---|---|---|---|
| | | 1 | 2 | 3 | 4 | 5 |
| Composition (part by mass) | Resin 1 | 11.8 | | | | |
| | Resin 2 | | 11.8 | | | |
| | Resin 3 | | | 11.8 | | |
| | Resin 4 | | | | 11.8 | |
| | Resin 5 | | | | | 11.8 |
| | Polyfunctional (meth)acrylate 1 | 37.3 | 37.3 | 37.3 | 37.3 | 37.3 |
| | Polyfunctional (meth)acrylate 2 | | | | | |
| | Polyfunctional (meth)acrylate 3 | | | | | |
| | Polyfunctional (meth)acrylate 4 | | | | | |
| | Polyfunctional (meth)acrylate 5 | | | | | |
| | Polyfunctional (meth)acrylate 6 | 14.2 | 14.2 | 14.2 | 14.2 | 14.2 |
| | Polymerization inhibitor | 0.1 | 0.1 | 0.1 | 0.1 | 0.1 |
| | Pigment | 17.8 | 17.8 | 17.8 | 17.8 | 17.8 |
| | Extender pigment | 2.0 | 2.0 | 2.0 | 2.0 | 2.0 |
| | Photopolymerization initiator 1 | 2.0 | 2.0 | 2.0 | 2.0 | 2.0 |
| | Photopolymerization initiator 2 | 4.0 | 4.0 | 4.0 | 4.0 | 4.0 |
| | Photopolymerization initiator 3 | 3.0 | 3.0 | 3.0 | 3.0 | 3.0 |
| | Pigment dispersing agent | 2.0 | 2.0 | 2.0 | 2.0 | 2.0 |
| | Surfactant 1 | 2.0 | 2.0 | 2.0 | 2.0 | 2.0 |
| | Surfactant 2 | | | | | |
| | Surfactant 3 | | | | | |
| | Additive | 3.0 | 3.0 | 3.0 | 3.0 | 3.0 |
| | Wax | 1.0 | 1.0 | 1.0 | 1.0 | 1.0 |
| | Total | 100 | 100 | 100 | 100 | 100 |

TABLE 1-2

| | | Ink type | | | | |
|---|---|---|---|---|---|---|
| | | 6 | 7 | 8 | 9 | 10 |
| Composition (part by mass) | Resin 1 | 11.8 | 11.8 | 11.8 | 11.8 | 11.8 |
| | Resin 2 | | | | | |
| | Resin 3 | | | | | |
| | Resin 4 | | | | | |
| | Resin 5 | | | | | |
| | Polyfunctional (meth)acrylate 1 | | | | | 37.3 |
| | Polyfunctional (meth)acrylate 2 | 37.3 | | | | |
| | Polyfunctional (meth)acrylate 3 | | 37.3 | | | |
| | Polyfunctional (meth)acrylate 4 | | | 37.3 | | |
| | Polyfunctional (meth)acrylate 5 | | | | 37.3 | |
| | Polyfunctional (meth)acrylate 6 | 14.2 | 14.2 | 14.2 | 14.2 | 14.2 |
| | Polymerization inhibitor | 0.1 | 0.1 | 0.1 | 0.1 | 0.1 |
| | Pigment | 17.8 | 17.8 | 17.8 | 17.8 | 17.8 |
| | Extender pigment | 2.0 | 2.0 | 2.0 | 2.0 | 2.0 |
| | Photopolymerization initiator 1 | 2.0 | 2.0 | 2.0 | 2.0 | 2.0 |
| | Photopolymerization initiator 2 | 4.0 | 4.0 | 4.0 | 4.0 | 4.0 |
| | Photopolymerization initiator 3 | 3.0 | 3.0 | 3.0 | 3.0 | 3.0 |
| | Pigment dispersing agent | 2.0 | 2.0 | 2.0 | 2.0 | 2.0 |
| | Surfactant 1 | 2.0 | 2.0 | 2.0 | 2.0 | |
| | Surfactant 2 | | | | | 2.0 |
| | Surfactant 3 | | | | | |
| | Additive | 3.0 | 3.0 | 3.0 | 3.0 | 3.0 |
| | Wax | 1.0 | 1.0 | 1.0 | 1.0 | 1.0 |
| | Total | 100 | 100 | 100 | 100 | 100 |

TABLE 1-3

| | | Ink type | | | | |
|---|---|---|---|---|---|---|
| | | 11 | 12 | 13 | 14 | 15 |
| Composition (part by mass) | Resin 1 | 11.8 | 11.8 | 11.8 | 11.8 | 11.8 |
| | Resin 2 | | | | | |
| | Resin 3 | | | | | |
| | Resin 4 | | | | | |
| | Resin 5 | | | | | |
| | Polyfunctional (meth)acrylate 1 | 37.3 | 37.3 | 37.3 | 37.3 | 37.3 |
| | Polyfunctional (meth)acrylate 2 | | | | | |
| | Polyfunctional (meth)acrylate 3 | | | | | |
| | Polyfunctional (meth)acrylate 4 | | | | | |
| | Polyfunctional (meth)acrylate 5 | | | | | |
| | Polyfunctional (meth)acrylate 6 | 14.2 | 16.2 | 15.2 | 11.2 | 9.2 |
| | Polymerization inhibitor | 0.1 | 0.1 | 0.1 | 0.1 | 0.1 |
| | Pigment | 17.8 | 17.8 | 17.8 | 17.8 | 17.8 |
| | Extender pigment | 2.0 | 2.0 | 2.0 | 2.0 | 2.0 |
| | Photopolymerization initiator 1 | 2.0 | 2.0 | 2.0 | 2.0 | 2.0 |
| | Photopolymerization initiator 2 | 4.0 | 4.0 | 4.0 | 4.0 | 4.0 |
| | Photopolymerization initiator 3 | 3.0 | 3.0 | 3.0 | 3.0 | 3.0 |
| | Pigment dispersing agent | 2.0 | 2.0 | 2.0 | 2.0 | 2.0 |
| | Surfactant 1 | | | 0.5 | 5.0 | 7.0 |
| | Surfactant 2 | | | | | |
| | Surfactant 3 | 2.0 | | | | |
| | Additive | 3.0 | 3.0 | 3.0 | 3.0 | 3.0 |
| | Wax | 1.0 | 1.0 | 1.0 | 1.0 | 1.0 |
| | Total | 100 | 100 | 100 | 100 | 100 |

<Printing Test>

A water-based planographic printing plate (XP-F, manufactured by Fujifilm Corporation) was attached to an offset printing machine (Oliver 266EPZ, manufactured by Sakurai Graphic Systems Corporation). Using tap water mixed with an etchant (SOLAIA-505, manufactured by T&K TOKA Corporation) as a dampening water, and using each ink, printing on 5000 sheets of coated paper was carried out. Irradiation with ultraviolet ray was carried out using an ultraviolet irradiation apparatus manufactured by USHIO Inc. (120 W/cm, single ultrahigh-pressure metal halide lamp) at a belt conveyor speed of 80 m/min. to allow curing of the ink to obtain a printed matter. The results are shown in Table 2-1 and Table 2-2.

<Measurement of pH>

Using a pH measurement device (F-52, manufactured by Horiba, Ltd.), the pHs of the inks and the dampening waters used in the printing test were measured. In the present description, the pH of each ink is a pH measured for 1% by mass aqueous solution of the ink at 25° C., and the pH of each dampening water is a pH measured at 25° C.

<Evaluation Method>

The results of the printing test were evaluated as follows.

(1) Emulsification Performance

Printing was carried out while increasing the amount of supply of the dampening water in three stages (1→2→3) by turning the dampening water supply dial of the printing machine, and evaluation was carried out on the following 3-point scale. In cases where the increases in the amount of supply of the dampening water lead to neither scumming nor poor halftone dot reproducibility, this result indicates that the dampening water incorporation ability is high, and that the optimal emulsified state can be maintained with a wide range of water tolerance.

3: No deterioration in the printing quality was found with any of the amounts of supply of the dampening water.
2: Deterioration in the printing quality was found with the amount of supply of the dampening water at dial 3.
1: Deterioration in the printing quality was found with the amount of supply of the dampening water at dial 2.

(2) Scumming Density

The indigo blue density in the non-image area of the printed matter with respect to the indigo blue density in the solid area of the printed matter, which was taken as 2.0, as observed when printing was carried out with a dampening water supply dial setting of 1, was evaluated using a reflection densitometer (manufactured by GretagMacbeth; SpectroEye). In cases where the reflection density exceeded 0.20, the scumming resistance was rated as poor; in cases where the reflection density was not more than 0.10, the scumming resistance was rated as good; and in cases where the reflection density was not more than 0.05, the scumming resistance was rated as excellent.

(3) Halftone Dot Reproducibility

The dot gain value of a 50% halftone dot area on a printed matter prepared by printing with a dampening water supply dial setting of 1 was measured using a reflection densitometer (manufactured by GretagMacbeth; SpectroEye). In cases where the dot gain value is within the range of 14±3%, the halftone dot reproducibility is good. Outside this range, the halftone becomes thick or thin, leading to a poor printing quality.

[Examples 1 to 6, and Comparative Example 1]
<Changing of pH of Dampening Water>

Ink 1 was prepared, and the pH of the dampening water was changed as shown in Table 2. As a result, as the pH of the dampening water increased, emulsification of the ink to the dampening water occurred more excessively, so that the ink became less repellent to the dampening water. Thus, the scumming density tended to increase, leading to a higher dot gain value. Further, as shown in Example 2, also in the case where the pH of the ink was lower than the pH of the dampening water, the same tendency was found as in the cases where the pH was increased. As the pH of the dampening water decreased, the emulsification performance tended to decrease, leading to a smaller dot gain value.

[Examples 7 to 9, and Comparative Example 2]
<Changing of Resin>

Inks 2 to 5 were prepared by changing the pH value by changing the resin composition from that of Ink 1 of Example 1, and used to carry out printing. As the acid value of the resin increased, the pH of the ink tended to slightly decrease. In the case where the resin had no acid value, the pH of the ink became more basic. Thus, the scumming density tended to increase, leading to an increased dot gain value.

[Examples 10 to 13] <Changing of Polyfunctional (Meth)Acrylate Having Hydroxyl Group>

Inks 6 to 9 were prepared by changing the composition of the polyfunctional (meth)acrylate having a hydroxyl group from that of Ink 1 of Example 1, and used to carry out printing. As the hydroxyl value increased, the ink cohesiveness tended to increase, leading to a lower scumming density. However, the dot gain value also tended to decrease.

[Examples 14 to 19] <Changing of Type and Content of Surfactant>

Inks 10 to 15 were prepared by changing the type and the content of the surfactant from those of Ink 1 of Example 1, and used to carry out printing. As the HLB value of the surfactant increased, the dampening water became more likely to be incorporated, and the scumming density tended to increase. Similarly, as the content of the surfactant increased, the dampening water became more likely to be incorporated, and the scumming density tended to increase.

<Washing Off of Ink after Printing>

After the printing tests of Examples 1 to 19 and Comparative Examples 1 and 2, washing was carried out using 1% by mass aqueous solution of a commercially available basic detergent (Magiclin, manufactured by Kao Corporation). In all of the Examples and Comparative Example 1, the ink could be washed off without leaving unwashed areas. In contrast, Comparative Example 2 showed residual ink insoluble in the washing liquid.

TABLE 2-1

| | Example number | | | | | | | | | |
|---|---|---|---|---|---|---|---|---|---|---|
| | 1 | 2 | 3 | 4 | 5 | 6 | 7 | 8 | 9 | 10 |
| Ink | 1 | 1 | 1 | 1 | 1 | 1 | 2 | 3 | 4 | 6 |
| pH (A) of Ink | 5.4 | 5.4 | 5.4 | 5.4 | 5.4 | 5.4 | 5 | 5.3 | 5.7 | 5.6 |
| pH (B) of dampening water | 4.4 | 5 | 3.6 | 2.9 | 1.3 | 6.4 | 3.4 | 4.3 | 4.3 | 4.2 |
| pH (A) − pH (B) | 1 | 0.4 | 1.8 | 2.5 | 4.1 | −1 | 1.6 | 1 | 1.4 | 1.4 |
| Emulsification performance | 3 | 2 | 3 | 2 | 1 | 2 | 3 | 3 | 2 | 3 |
| Scumming density | 0.03 | 0.14 | 0.03 | 0.04 | 0.01 | 0.26 | 0.07 | 0.05 | 0.12 | 0.02 |
| Halftone dot reproducibility (%) | 15 | 17 | 13 | 11 | 10 | 20 | 17 | 16 | 18 | 13 |

TABLE 2-2

|  | Example number | | | | | | | | | Comparative Example number | |
| --- | --- | --- | --- | --- | --- | --- | --- | --- | --- | --- | --- |
|  | 11 | 12 | 13 | 14 | 15 | 16 | 17 | 18 | 19 | 1 | 2 |
| Ink | 7 | 8 | 9 | 10 | 11 | 12 | 13 | 14 | 15 | 1 | 5 |
| pH (A) of Ink | 5.7 | 5.5 | 5.7 | 5.5 | 5.4 | 5.3 | 5.4 | 5.4 | 5.5 | 5.8 | 7.8 |
| pH (B) of dampening water | 4.3 | 4.3 | 4.3 | 4.3 | 4.3 | 4.1 | 4.4 | 4.3 | 4.3 | 7.5 | 5 |
| pH (A) − pH (B) | 1.4 | 1.2 | 1.4 | 1.2 | 1.1 | 1.2 | 1 | 1.1 | 1.2 | −1.7 | 2.8 |
| Emulsification performance | 3 | 3 | 3 | 3 | 2 | 1 | 2 | 3 | 2 | 1 | 1 |
| Scumming density | 0.08 | 0.04 | 0.09 | 0.04 | 0.03 | 0 | 0.02 | 0.1 | 0.19 | 1.42 | 0.37 |
| Halftone dot reproducibility (%) | 16 | 11 | 17 | 15 | 12 | 10 | 11 | 17 | 18 | 24 | 19 |

The invention claimed is:

1. A method of producing a printed matter, the method comprising the steps of:
   providing a planographic printing plate having disposed thereon a hydrophilic layer and a heat sensitive layer disposed on the hydrophilic layer;
   providing dampening water to adhere to the hydrophilic layer;
   providing an ink to adhere to the heat sensitive layer; and
   transferring the ink adhering to the heat sensitive layer to an object to be printed; wherein
   the ink comprises a resin having an acidic group, and a polyfunctional (meth)acrylate having a hydroxyl group; and
   the pH (A) of the ink and the pH (B) of the dampening water are both from 1 to 6.5.

2. The method of producing a printed matter according to claim 1, wherein the pH (A) of the ink and the pH (B) of the dampening water satisfy (A)>(B).

3. The method of producing a printed matter according to claim 1, wherein the pH (B) of the dampening water is from 3 to 6.

4. The method of producing a printed matter according to claim 1, wherein the pH (A) of the ink is from 3 to 6.

5. The method of producing a printed matter according to claim 1, wherein the difference between the pH (A) of the ink and the pH (B) of the dampening water (pH (A)−pH (B)) is from 1 to 2.

6. The method of producing a printed matter according to claim 1, wherein the step of transferring the adhering ink to the object to be printed is a step of transferring the adhering ink to the object to be printed, directly or through a blanket.

7. The method of producing a printed matter according to claim 1, comprising a step of irradiating the ink transferred to the object to be printed, with an active energy ray.

8. The method of producing a printed matter according to claim 7, wherein the active energy ray is an emission line having a wavelength of from 350 to 420 nm emitted from a light emitting diode.

9. The method of producing a printed matter according to claim 1, comprising a step of washing the printing plate and/or the blanket with wash water after printing.

10. The method of producing a printed matter according to claim 9, wherein the wash water has a pH of from 8 to 13.

11. The method of producing a printed matter according to claim 1, wherein the acidic group of the resin having an acidic group has at least one selected from the group consisting of a carboxyl group, a sulfo group, and a phosphate group.

12. The method of producing a printed matter according to claim 1, wherein the resin having an acidic group has an acid value of from 30 mg KOH/g to 250 mg KOH/g.

13. The method of producing a printed matter according to claim 1, wherein the resin having an acidic group has an ethylenically unsaturated group.

14. The method of producing a printed matter according to claim 13, wherein the resin having an acidic group has an iodine value of from 0.5 mol/kg to 3.0 mol/kg.

15. The method of producing a printed matter according to claim 1, wherein the polyfunctional (meth)acrylate having a hydroxyl group has a hydroxyl value of from 50 mg KOH/g to 200 mg KOH/g.

16. The method of producing a printed matter according to claim 1, wherein the ink comprises a photopolymerization initiator.

17. The method of producing a printed matter according to claim 1, wherein the ink comprises a surfactant.

18. The method of producing a printed matter according to claim 17, wherein the surfactant has an HLB value of from 8 to 18.

19. The method of producing a printed matter according to claim 17, wherein the content of the surfactant in the ink is from 1% by mass to 10% by mass.

20. The method of producing a printed matter according to claim 1, wherein the ink comprises the resin having an acidic group in an amount of 5% to 50% by mass, and the polyfunctional (meth)acrylate having a hydroxyl group in an amount of 20% to 70% by mass.

* * * * *